March 26, 1940.  M. R. BOIU  2,194,817
BALL BEARING CONSTRUCTION
Filed April 22, 1938
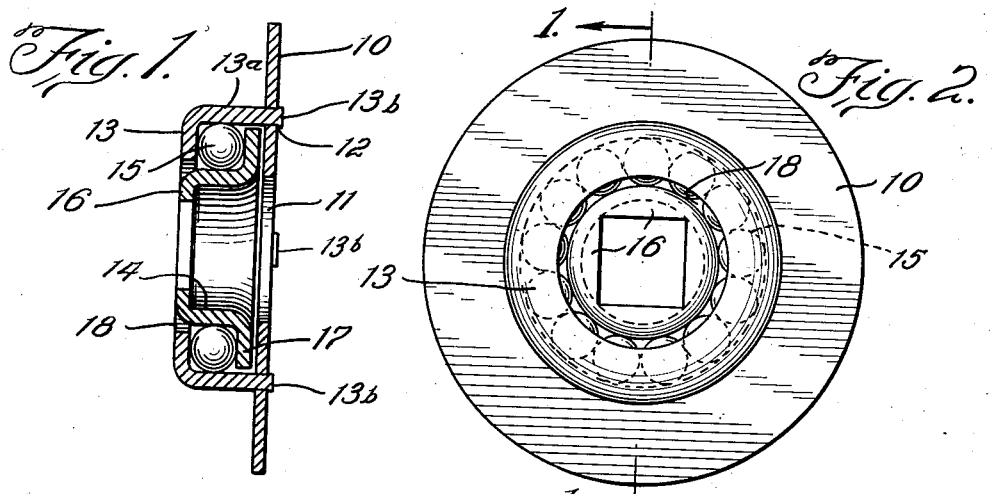
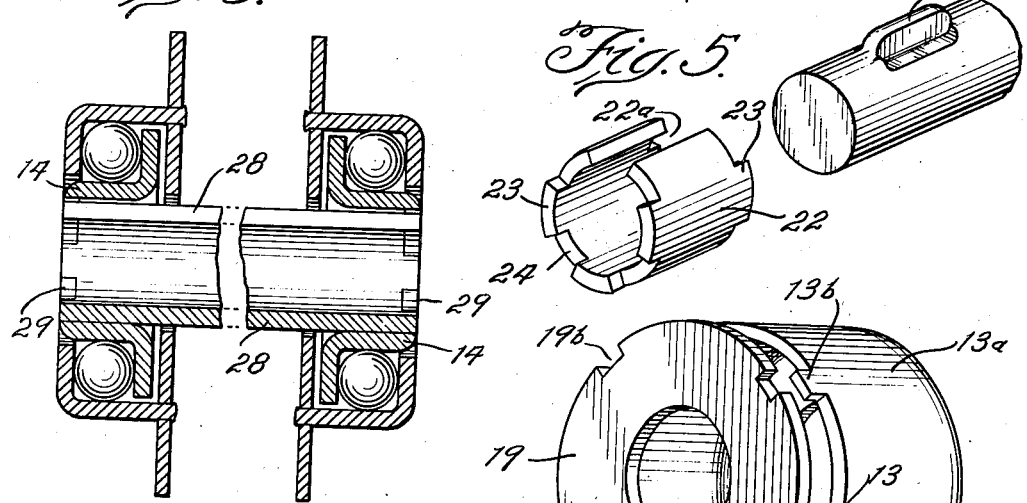
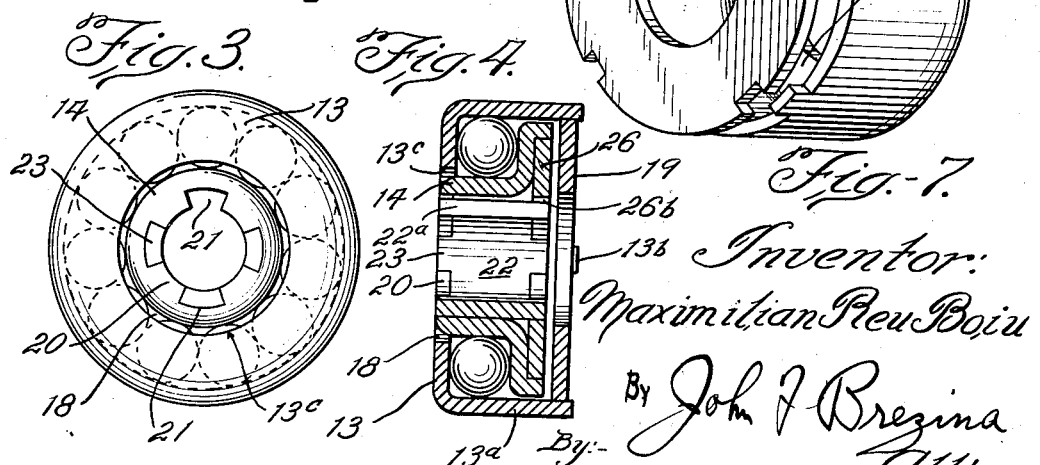
Inventor:
Maximilian Reu Boiu
By John J Brezina
Atty.

Patented Mar. 26, 1940

2,194,817

UNITED STATES PATENT OFFICE 2,194,817

BALL BEARING CONSTRUCTION

Maximilian Reu Boiu, Harvey, Ill.

Application April 22, 1938, Serial No. 203,496

8 Claims. (Cl. 308—193)

This invention relates to a ball bearing construction or ball bearing unit particularly adapted for children's wagons, tricycles, coasters and other toys which have traction wheels or driving wheels and which preferably utilize a ball bearing unit mounted upon the axle, spindle, or other similar portion of the vehicle or toy.

It is well known that presently known and conventional ball bearing units used for articles of the aforementioned class include a construction employing an inner race which is usually ring shaped and which has a conventional annular flange which is merely slipped upon the usually round axle of the vehicle, and which further has an annular open space or opening between the periphery of said axle-engaging flange and the outer ring member of the bearing unit. Such presently known and conventional ball bearings soon become clogged with dirt, sand or other foreign material entering the aforesaid annular opening, and the balls of the ball bearing become stuck, clogged and rusted, to prevent rotation, thereby causing the central flange of the inner race to rotate upon the axle as an ordinary metal friction bearing and usually causing a wearing away of the axle to form an annular cut groove or ridge at the point where it is surrounded by the friction bearing surface of such inner race. It is also well known that presently known and conventional types of ball bearings used on articles of the described class are so constructed that they cannot be disassembled and consequently it is impossible to clean the same against the undesirable foreign matter and return the ball bearing to its originally intended function and operation. The formation of the worn-away ridge upon the axles, as for example, on an ordinary coaster wagon, is also undesirable as it not only continually increases the friction, but destroys any future possibility of efficiently using a properly operating ball bearing upon such worn axle.

It is therefore an important object of my invention to provide a ball bearing unit of novel construction with an internal race and other parts providing for the insertion of an axle having suitable projections thereon to cause the inner race to always rotate with the axle in those types of tricycles or other toys wherein the axle is rotated. A further object of this invention is to provide a ball bearing construction for wagons or other toys having an internal metal race and a novel bushing or sleeve secured therein, which bushing is secured to always rotate with the race and also with the axle, said bushing being adapted to receive the rotating axle of the vehicle or other toy having traction wheels.

A further important object of my invention is the provision of a novel construction of a ball bearing unit for wagons, tricycles, coasters and other units usually used by children having a novel construction of casing or housing which prevents normal and undesirable entry of dirt, sand and other foreign matter to the annular chamber containing the ball bearings in order to avoid a clogging, rusting and non-operation of such bearings.

A further object of the invention is to provide a ball bearing unit having an internal annular race formed with an integral outer apertured flange, the aperture thereof being shaped in a square, triangle, hexagon or other non-rounded shape so that an axle having a cross section of corresponding shape may be inserted therethrough to thereby insure that the complete inner race will rotate with the axle and not around the axle during the entire life of the unit.

It is a further and important object of my invention to provide a ball bearing construction which includes means for locking the inner race thereof upon an axle so that such inner race will not rotate around the axle, but which will rotate only upon the ball bearings provided therefor.

Other and important objects of this invention will be apparent from the following description, claims and accompanying drawing.

This invention (in a preferred form) is illustrated and descibed in the accompanying specification and drawing.

Fig. 1 is a vertical cross section view of a ball bearing unit of my invention.

Fig. 2 is a side elevation view of the ball bearing unit of my invention, Fig. 1 being taken from 1—1 of Fig. 2.

Fig. 3 is a side elevation view of the ball bearing unit of my invention having certain parts of slightly modified form.

Fig. 4 is a cross section view taken from line 4—4 of Fig. 3.

Fig. 5 is a perspective view of a bushing sleeve and a segment of an axle, forming a part of my invention.

Fig. 6 is a vertical cross section view of a pair of ball bearing units of the type illustrated in elevation in Fig. 3.

Fig. 7 is a large perspective view showing the back or reverse side of the outer shell or race of my invention.

On the drawing:

Referring to Fig. 1, reference numeral 10 designates a substantially flat metal disc or washer which has a central aperture 11 of sufficient size for insertion therethrough of an axle or the like. Reference numeral 13 represents a cup-like metal annular cap or casing which forms an annular housing and which has its edges formed into annular flange 13a which extends at substantially right angles to the outer flat portion thereof. The annular flange 13a, together with the adjacent portion of the cap 13 form the outer race for the ball bearings which ride on the inner surfaces thereof and which are mounted therein in the herein described manner. The annular flange 13a has a plurality of integrally formed relatively small lugs or projections 13b which are inserted into and engage in suitable spaced apertures formed in the disc 10, said apertures being formed at spaced apart points in disc 10 to correspond with the relative positions of the said lugs.

Before casing or outer race 13 is mounted on and secured to disc 10, the inner annular race member 14 is inserted into said outer race and cap or casing 13 together with a desirable number of ball bearings 15 and in the manner illustrated in Figs. 1 and 2 of the drawing. The inner race member 14 has its outer central integral portion formed with inwardly extending flanges, and these define an aperture of non-round shape, as for example, a square, as illustrated in Fig. 2. Said integral outer flanges 16 define the aperture of square or other non-round shape. The annular inner race member 14 is formed so that its innermost portion is bent at substantially right angles to form radial annular flange 17 thereon, said annular inner flange 17 and the intermediate portion of the race member forming the friction surface of said inner race upon which the ball bearings roll.

Fig. 2 of the drawing is a front elevation of the structure shown in cross section in Fig. 1 and shows the flanges 16 of the inner race 14 defining the square hole for the reception of a square axle which will fit snugly thereinto.

The outer periphery of the disc or washer 10 is of sufficient size to permit it to be conveniently secured either to the hub or to the central portion of a conventional disk wheel as, for example, by spot-welding. To properly and securely mount a conventional disc or wire wheel upon a coaster wagon, two of the ball bearing units such as illustrated in Figs. 1 and 2 would be utilized, one thereof being secured at the outer end of the wheel hub and the other at the inner end of the wheel hub to thereby mount and maintain the wheel perpendicular to the axle. The axle upon which such a wheel would be mounted would be of an irregular cross-sectional shape, preferably to correspond to the shape of the aperture defined by the inner race.

This construction would always insure that the inner race 14 would not rotate and ride upon the ball bearings 15 and would further eliminate the undesirable frictional engagement of presently known constructions wherein the inner race stops rotating because of clogging of the ball bearings, and wherein the round axle within rotates upon the metal plain bearing surface of the inner race to quickly wear away both the inner race and the axle.

The diameter of the outer portion of the inner race 14 is such that when mounted as illustrated in Figs. 1 and 2, an annular opening 18 will be formed surrounding said inner race 14, this permitting convenient oiling of the bearings at desirable intervals.

Figs. 3 and 4 illustrate a slightly modified form of the bearing illustrated in Figs. 1 and 2. In this modified form, the identical reference numeral 13 represents the cup-like outer race having the right angled flanges 13a and having the relatively large central aperture 13c therein which forms the annular opening 18 when the unit is wholly assembled. Numeral 19 designates a round disc or washer with its central aperture 19a and which has a plurality of peripheral recesses 19b therein as shown in Fig. 7. The flange 13a has a plurality of lugs of extensions 13b formed integral with its edge which are adapted to seat into the recesses 19a respectively and which, when the unit is wholly assembled, are preferably bent over and inwardly to hold the washer securely in place. The outer cup-like shell 13 forms the outer race for the ball bearings as before stated, and as shown in an enlarged form in perspective in Fig. 7.

The modified form of Figs. 3 and 4, which includes the outer race 13, also includes the inner race member 14 of the angular shape hereinbefore described except having a plurality of integral inwardly extending projections 20 formed integral therewith and defining a central aperture and a plurality of coincident spaced apart recesses 21, as clearly shown in Fig. 3. Numeral 14 designates the annular integral flange extending perpendicularly to said inner ball race. As shown in Fig. 5, numeral 22 designates a metal collar, sleeve, or bushing of cylindrical form having a plurality of integral end projections 23 at each end thereof, thereby forming spaced apart recesses 24 between said integral projections 23. The bushing 22 is inserted into the bearing unit into the position illustrated in Fig. 4 and so that the projections 23 engage and interlock with the recesses 21 of the inner race 14 and so that the integral projections 20 of said inner race seat into, engage and interlock with the recesses 24 respectively of the bushing 22. It will be apparent that when said bushing or collar is mounted in the described manner, it will be firmly mounted to rotate with the inner race 14 of the ball bearing unit. It is to be noted that the bearing 22 is formed so that a recess 22a is formed between its opposed edges, these being so located that when said bushing 22 is mounted in the inner race in the described manner, said recess 22a will register with one of the recesses 21 between two adjacent projections 20 of the inner race 14.

Said recess 22a is adapted to receive an integral projection formed on a conventional round axle, a segment whereof is illustrated at the right of Fig. 5, and said projection being designated by reference numeral 25. When the axle with such projections formed thereon is inserted into one or more of the bearings of the construction illustrated in Figs. 3 and 4, said projection 25 seats in and engages in the opening or recess 22a and also in one of the recesses 21 formed in the outer portion of the inner race 14, this insuring against any rotation of the axle within the bushing 22 and insuring that the inner race 14 will not rotate around the axle and that the ball bearings and the outer race 13 will rotate around it. As shown in Figs. 3, 4 and 7, the lugs 13b of the outer race 13 seat in and interengage with correspondingly spaced recesses 19b formed in disk or washer 19. The integral extensions 23 of said bushing 22 interengage with inwardly opening correspondingly spaced recesses formed in washer or disk 26. The extensions or lugs 23 on the opposite ends of said bushing interfit and intergage in correspondingly spaced recesses 21 of the inner race, as clearly shown in Fig. 3.

When the collar or bushing 22 is mounted into the ball bearing unit of the preferred form illustrated in Figs. 3 and 4, the inner disk 26 is secured between the outer edges of the annular flange of the inner race as shown in Fig. 4. This means of mounting of washer or disk 19 and inner disk 26 may be substantially similar, and also similar to that described with respect to washer or disk 10, the only difference being that disk 10 extends outwardly from the annular edge of outer race 13.

The construction shown in Fig. 6 is substantially identical to that described with reference to Fig. 4 with the exceptions that in the construction of Fig. 6 a bushing or sleeve 28 is employed which is locked at only one end by means of interengagement betwen integral end projections 29 and correspondingly spaced recesses formed in the inwardly extending flanged portion of the inner race 14. This construction, as shown in Fig. 6, would be employed where two ball bearing units are utilized to mount a single wheel upon the same axle and in the opposed relative position illustrated in Fig. 6.

The ball bearing construction of my invention is particularly adaptable in the building of tricycles and other velocipedes, walkers or other similar children's equipment which are propelled by a cranking action of the feet upon oppositely disposed cranks which bear foot pedals. In such type of play units, it is necessary that the wheel and axle be firmly secured together, and in this type of construction, a pair of inner race members 14 would be firmly secured against rotation in spaced apart position upon the axle which forms an integral part of the cranks. Such inner race members would be securely mounted upon the shaft by interlocking engagement between a suitable formed extension or abutment 25, as illustrated in Fig. 5, formed upon the axle at each of the points where one of the ball bearing units were to be mounted. Such inner race member would preferably be additionally secured by insertion of a suitable wedging sleeve or shim (not shown) so that the race member would be permanently maintained in a plane perpendicular to the axle.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim as my invention:

1. In a ball bearing construction, an outer cup-shaped casing forming an outer race, and having a central aperture therethrough; a disk on which said casing is mounted, said disk having a central aperture therein in registry with the aperture of said casing; an inner ball race comprising an annular member of right-angled cross section and having an integral annular flange extending perpendicularly to one portion of said inner ball race and having inwardly extending integral projections at its opposite and smaller end defining an aperture having one or more straight sides, the surfaces of said right-angled annular member forming a bearing surface; an inner disk engaging said perpendicularly extending flange at its periphery and a plurality of ball bearings between said inner and said outer race.

2. In a ball bearing construction, an outer cup-like shell having a central aperture therein and its inner surfaces forming adjacent bearing surfaces substantially perpendicular to each other; an inner race member including an outwardly and radially extending integral flange, the inner surfaces of said outer race and the outer surfaces of said inner race forming an annular ball bearing chamber of substantially rectangular cross-section; a plurality of inwardly extending lugs formed integral with the reduced portion of said inner race member; a cylindrical bushing mounted in the apertures of said members and having a plurality of end recesses therein, said lugs of said inner race engaging with the recesses of said bushing; a centrally apertured disk secured upon said outer race member; and a plurality of ball bearings between the bearing surfaces of said race members.

3. In a ball bearing having a cup-like shell having a central aperture therein and having inner annular bearing surfaces substantially perpendicular to each other; the periphery of said shell having a plurality of integral extensions formed thereon, said shell forming an outer race member; an inner race member having a central aperture and mounted within said outer race member and having annular bearing surfaces opposite to the bearing surfaces of said outer race member and having spaced apart projections at its outer edges defining a non-round aperture; a bushing sleeve mounted coaxially with said inner race member having end lugs in locking engagement with the recesses between said spaced apart projections of said inner race; and a plurality of ball bearings between the bearing surfaces of said inner and outer race members.

4. In a ball bearing having a cup-like shell having a central aperture therein and having inner annular bearing surfaces substantially perpendicular to each other; the periphery of said shell having a plurality of integral extensions formed thereon, said shell forming an outer race member; an inner race member having a central aperture and mounted within said outer race member and having annular bearing surfaces opposite to the bearing surfaces of said outer race member and having spaced apart projections at its outer edges defining a non-round aperture; a bushing sleeve mounted coaxially with said inner race member having end lugs in locking engagement with the recesses between said spaced apart projections of said inner race; a plurality of ball bearings between the bearing surfaces of said inner and outer race members; and a disk engaging said outer race member and engaging said integral extension thereof.

5. In a ball bearing unit, a cup-like metal shell forming an outer race and having inner bearing surfaces; an inner race member having an integral radial extending portion forming bearing surfaces angularly disposed to each other, said radial extending portion of said inner race having its periphery formed to extend transversely and substantially parallel to the main portion of said inner race member; said inner race member having a plurality of integral inwardly extending lugs at its reduced end; a metal washer mounted within the transversely extending flanged edge of said inner race member and having a central aperture defined by a serrated edge; and a bushing mounted within said inner race member and having integral lugs at its opposite ends engaging said serrated edge of said washer and said inwardly extending lugs of said inner race, and a plurality of ball bearings between the opposed bearing surfaces of said inner and outer race members.

6. In a ball bearing unit, a cup-like metal shell forming an outer race and having inner bearing surfaces; an inner race member having an integral radial extending portion forming a bearing surface, said radial extending portion of said inner race having means thereon for engaging the periphery of a washer or the like; said inner race member having a plurality of integral inwardly extending lugs at its reduced end; a metal washer mounted upon the radially extending portion of said inner race and having a central aperture defined by serrated edge; and a bushing sleeve mounted within said inner race member and having integral end lugs engaging said serrated edge and said inwardly extending lugs of said inner race, and plurality of ball bearings between the opposed bearing surfaces of said inner and outer race members.

7. In a ball bearing unit, a cup-shaped outer race presenting inner annular bearing surfaces and having a horizontally extending annular edge, an inner race member in said outer race presenting bearing surfaces opposed to the bearing surfaces of said outer race and having a reduced end terminating in inwardly extending flanges defining a non-round central aperture; a washer upon the opposite end of said inner race member, a bushing sleeve between said inwardly extending race flanges and said washer, the ends of said bushing sleeve being in interlocking engagement with said race flanges and said washer, a centrally apertured outer metal disk secured between the annular edge of said outer race; and a plurality of ball bearings between the opposed bearing surfaces of said race.

8. In a ball bearing unit, a cup-shaped outer race presenting inner annular bearing surfaces and having a horizontally extending annular edge, an inner race member in said outer race presenting bearing surfaces opposed to the bearing surfaces of said outer race and having a reduced end terminating in inwardly extending flanges defining a non-round central aperture; a bushing sleeve within said inwardly extending race flanges and said inner race member, a centrally apertured outer metal disk secured between the annular edge of said outer race; and a plurality of ball bearings between the opposed bearing surfaces of said race.

MAXIMILIAN REU BOIU.